(12) United States Patent
Yang

(10) Patent No.: US 12,371,885 B2
(45) Date of Patent: Jul. 29, 2025

(54) FAUCET TRIM

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 72 days.

(21) Appl. No.: 18/479,380

(22) Filed: Oct. 2, 2023

(65) Prior Publication Data
US 2024/0410142 A1    Dec. 12, 2024

(30) Foreign Application Priority Data

Jun. 12, 2023  (TW) .................................. 112205941

(51) Int. Cl.
*F16L 5/10* (2006.01)
*E03C 1/04* (2006.01)

(52) U.S. Cl.
CPC .............. *E03C 1/0401* (2013.01); *F16L 5/10* (2013.01); *E03C 2201/50* (2013.01)

(58) Field of Classification Search
CPC ............ E03C 2201/50; F16L 5/00; F16L 5/10
See application file for complete search history.

(56) References Cited

U.S. PATENT DOCUMENTS

| | | | | |
|---|---|---|---|---|
| 3,823,964 | A * | 7/1974 | Politz | F16L 5/00 285/46 |
| 4,385,777 | A * | 5/1983 | Logsdon | F16L 5/10 285/46 |
| 5,161,567 | A * | 11/1992 | Humpert | F16L 5/00 137/359 |
| 5,236,229 | A * | 8/1993 | Gonzalez | F16L 5/10 285/379 |
| 6,807,983 | B1 * | 10/2004 | Erickson | E03C 1/042 137/15.01 |
| 9,863,557 | B2 * | 1/2018 | Haynes | F16L 5/10 |
| 11,143,334 | B2 * | 10/2021 | O'Neill | E03C 1/021 |

* cited by examiner

*Primary Examiner* — Kevin F Murphy
(74) *Attorney, Agent, or Firm* — Muncy, Geissler, Olds & Lowe, P.C.

(57) ABSTRACT

A faucet trim is provided, wherein the faucet trim includes: a cover including a main body, a flange and a through hole, the flange projecting obliquely from a periphery of the through hole and being protrusive from the main body, the flange and the main body defining a receiving space therebetween; and a seal including a base and a projection projecting from the base, the projection and the base defining a groove in which the flange is engaged; wherein in the axial direction of the through hole, the base is not protrusive beyond the receiving space, the projection is located outside the receiving space, and the projection is partially overlapped with the through hole.

9 Claims, 7 Drawing Sheets

FAUCET TRIM

BACKGROUND OF THE INVENTION

Field of the Invention

The present invention relates to a faucet trim.

Description of the Prior Art

A faucet trim can cover the hole on the wall to enhance the overall texture, matching and aesthetics, wherein the embedded faucet trim is the most popular. The embedded faucet trim is used for trim a faucet embedded within the wall, to cover the faucet installation holes and exposed part of pipes in the wall to make the overall appearance more beautiful, and to prevent water droplets from seeping through the gaps to protect the faucet base.

However, the conventional embedded faucet trim needs to be locked through connecting members, such as screws, to be stably fixed. As a result, it requires providing holes in the faucet trim in advance, which not only reduces the waterproof ability but also affects the appearance of the faucet trim. Moreover, since the faucet trim should be fixed by screws, it affects the installation speed.

The present invention is, therefore, arisen to obviate or at least mitigate the above-mentioned disadvantages.

SUMMARY OF THE INVENTION

The main object of the present invention is to provide a faucet trim which can improve the combination with the faucet and has a good looking with a seal hidden behind the cover.

To achieve the above and other objects, a faucet trim is provided, wherein the faucet trim includes: a cover including a main body and a flange, the main body including a first side and a second side opposite to the first side, the main body further including a through hole disposed through the main body from the first side to the second side, the flange projecting obliquely from a periphery of the through hole and being protrusive from the second side, the flange and the main body defining a receiving space therebetween; and a seal including a base and a projection divided by an imaginary straight line, the projection projecting from the base, the projection and the base defining a groove in which the flange is engaged; wherein the imaginary straight line is perpendicular to an axial direction of the through hole, in the axial direction of the through hole the base is not protrusive beyond the receiving space, in the axial direction of the through hole the projection is located outside the receiving space, and in the axial direction of the through hole the projection is partially overlapped with the through hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
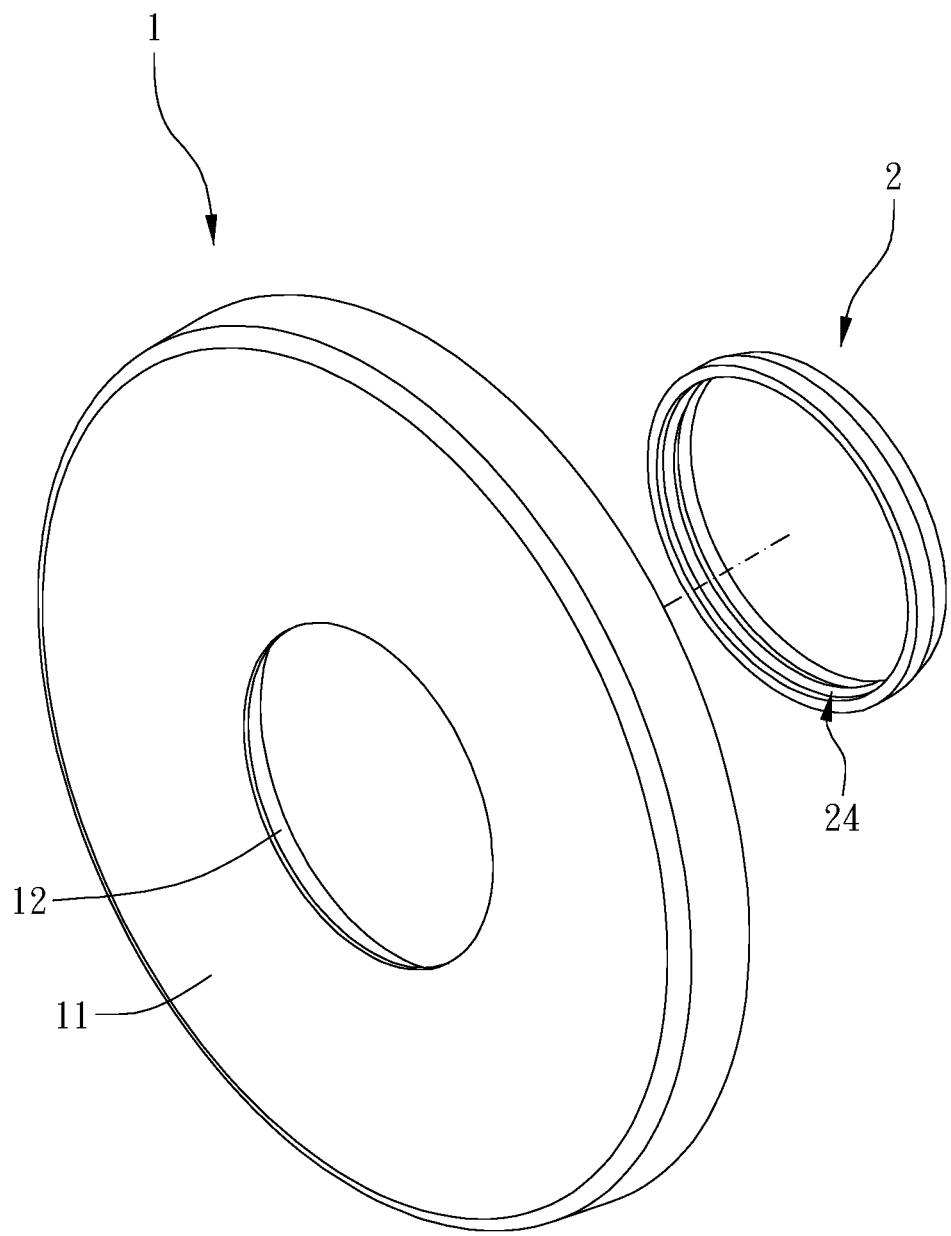
FIG. 1 is a perspective breakdown drawing of an exemplary embodiment of the present invention.
Figure 2:
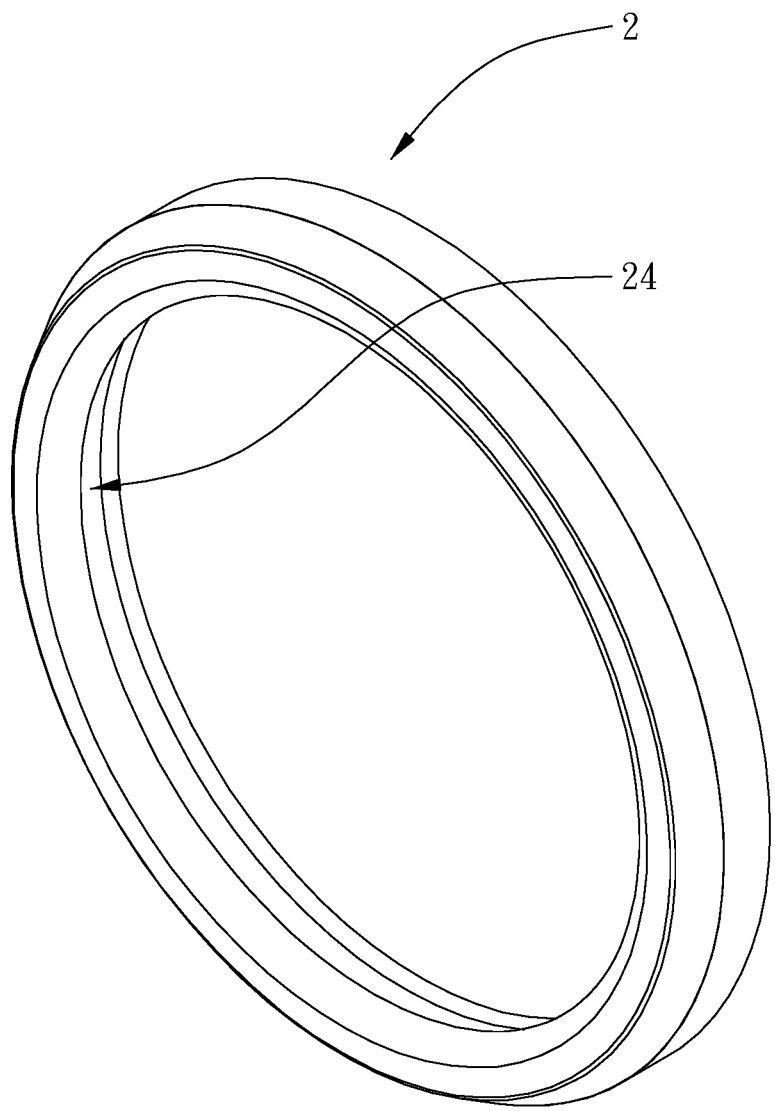
FIG. 2 is a stereogram of a seal of an exemplary embodiment of the present invention.
Figure 3:
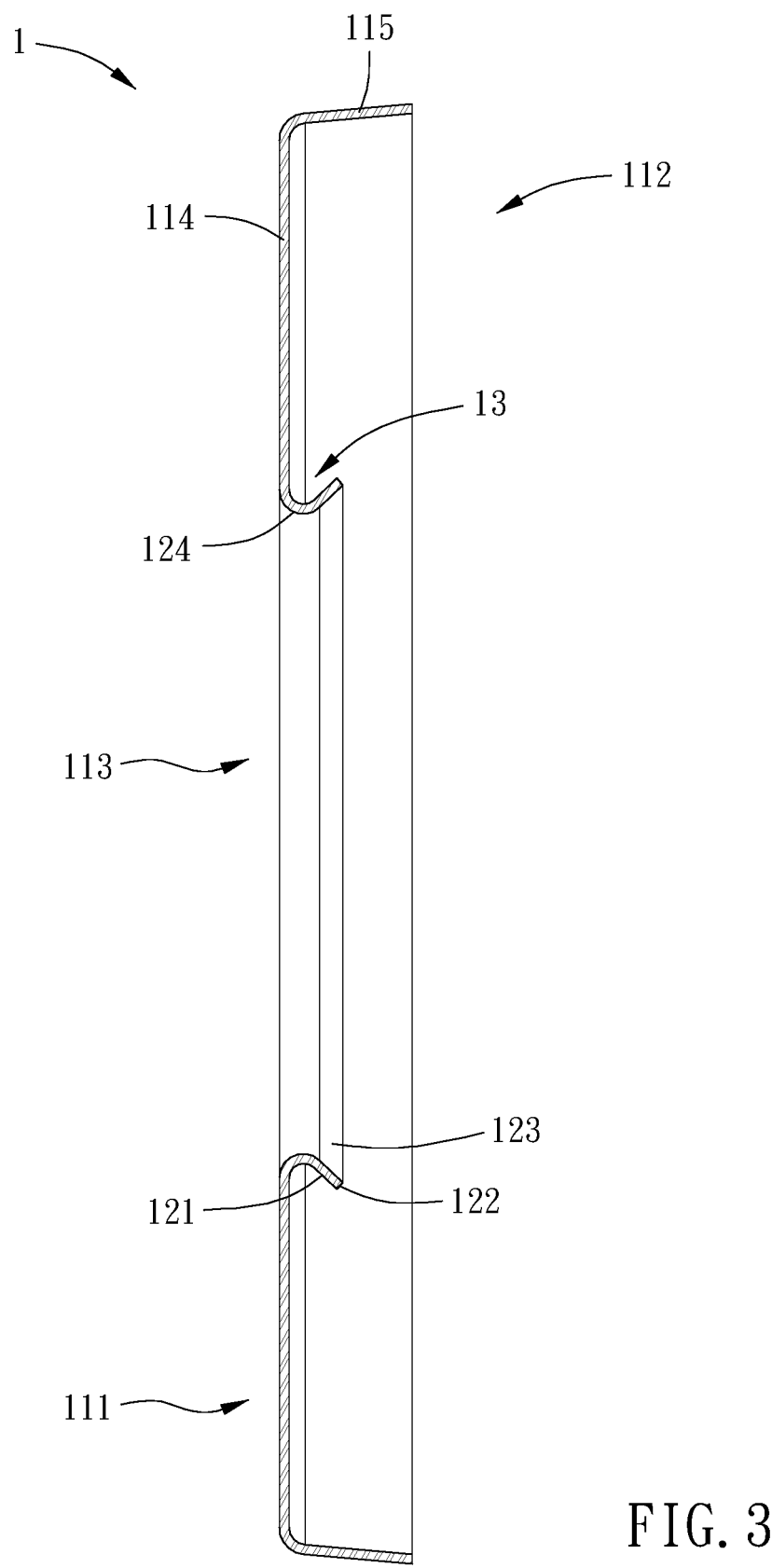
FIG. 3 is a cross-sectional view of a cover of an exemplary embodiment of the present invention.
Figure 4:
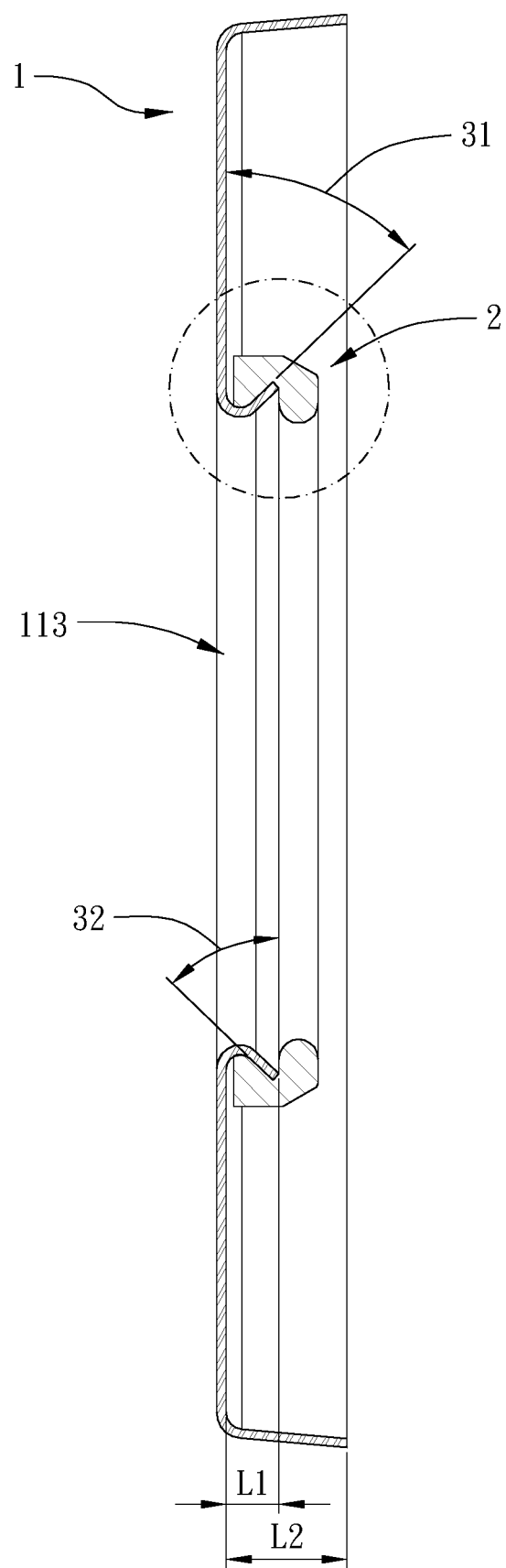
FIG. 4 is a cross-sectional view of a faucet trim of an exemplary embodiment of the present invention.
Figure 5:
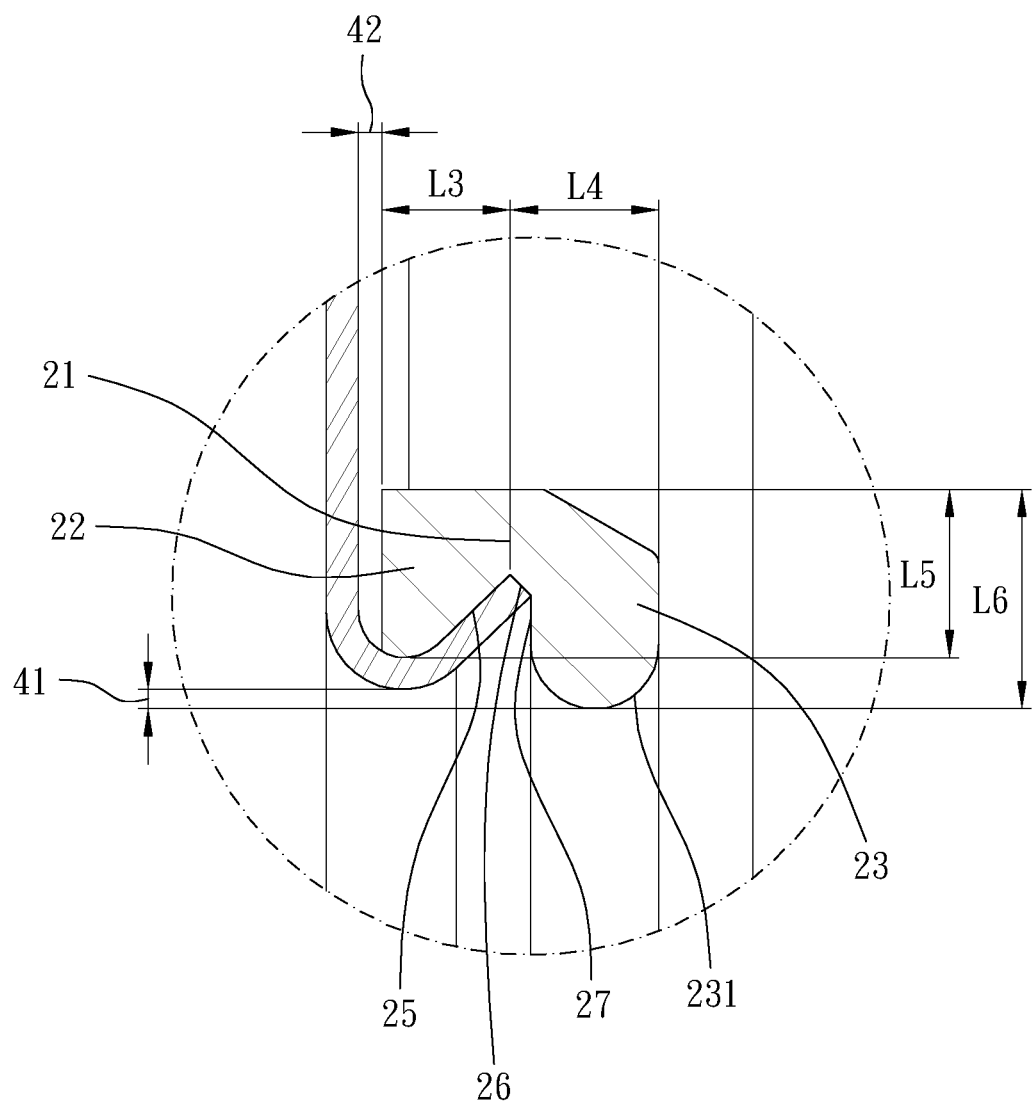
FIG. 5 is a partial enlargement of FIG. 4.
Figure 6:
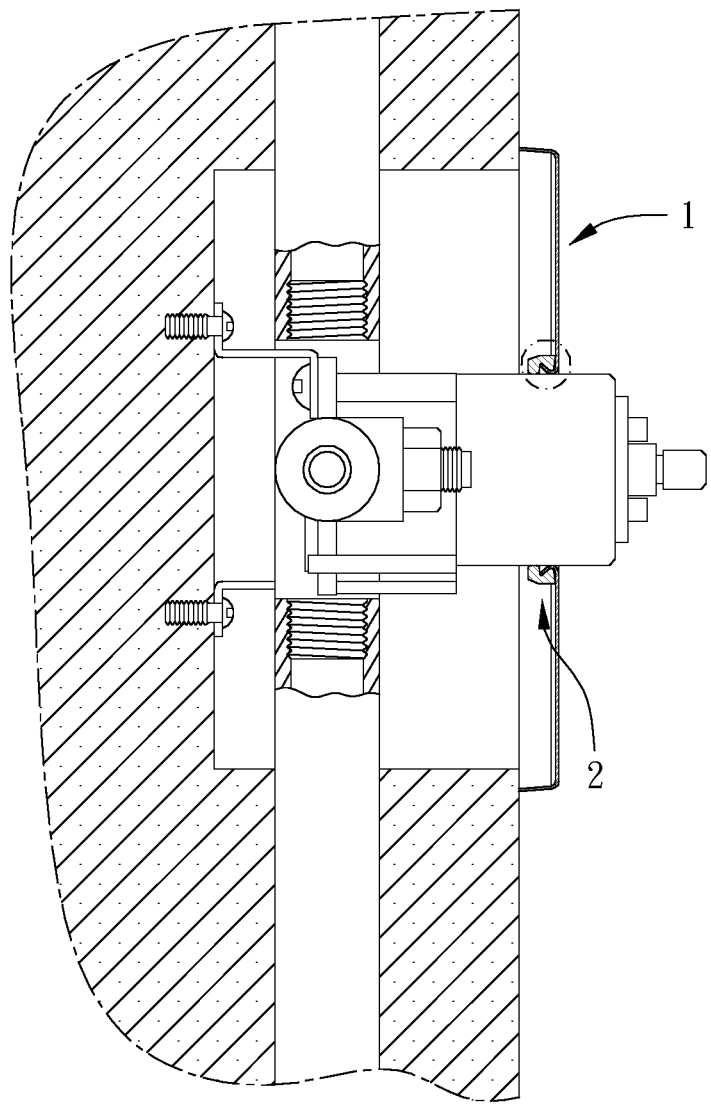
FIG. 6 is drawing showing an application of the faucet trim according to an exemplary embodiment of the present invention.
Figure 7:
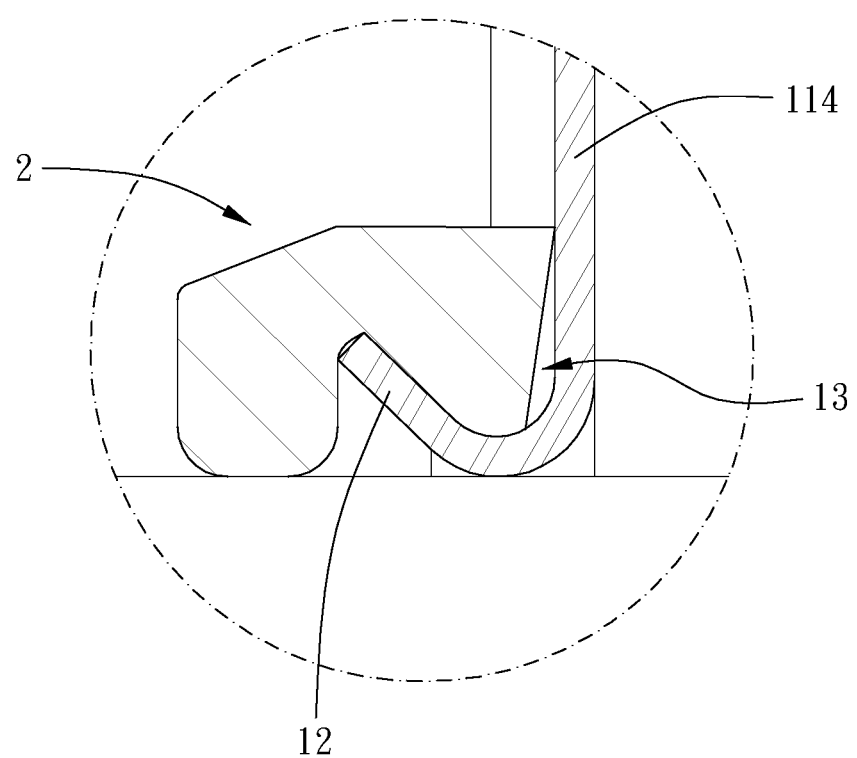
FIG. 7 is a partial enlargement of FIG. 6.

Please refer to FIGS. 1 to 7 for an exemplary embodiment of the present invention. A faucet trim of the present invention includes a cover 1 and a seal 2.

The cover 1 is integrally formed of one piece and preferably made of metal, which provides a strong structure and good durability. Specifically, the cover 1 includes a main body 11 and a flange 12, the main body 11 includes a first side 111 and a second side 112 opposite to the first side 111, the main body 11 further includes a through hole 113 disposed through the main body 11 from the first side 111 to the second side 112, the through hole 113 is configured for a faucet to be disposed therethrough, the flange 12 projects obliquely from a periphery of the through hole 113 and is protrusive from the second side 112, the flange 12 and the main body 11 define a receiving space 13 therebetween.

Specifically, the main body 11 includes a board 114 and a lip 115, the lip 115 extends transversely from the board 114, the board 114 includes the through hole 113, the flange 12 projects from the board 114, and the lip 115 is configured to be abutted against a wall and covers the flange 12. In the axial direction of the through hole 113, a ratio of a vertical distance L1 from an end of the lip 115 to the board 114 and a vertical distance L2 from an end of the flange 12 to the board 114 ranges from 1.8 to 2.3 so that there is an sufficient space, between the flange 12 and the wall, for installation of the seal 2.

The seal 2 is made of rubber and the seal 2 is integrally formed of one piece. Specifically, the seal 2 includes a base 22 and a projection 23 divided by an imaginary straight line 21, the imaginary straight line 21 and the board 114 are parallel to each other, the projection 23 projects from the base 22, and the projection 23 and the base 22 define a groove 24 in which the flange 12 is engaged.

The seal 2 is disposed around the flange 12, the imaginary straight line 21 is perpendicular to the axial direction of the through hole 113, in the axial direction of the through hole 113 the base 22 is not protrusive beyond the receiving space 13, in the axial direction of the through hole 113 the projection 23 is located outside the receiving space 13, and in the axial direction of the through hole 113 the projection 23 is partially overlapped with the through hole 113.

When the faucet is disposed through the through hole 113, the projection 23 can stably press the faucet and the projection 23 can stably support the cover 1. As such, it only needs to put the faucet trim on the faucet to complete the installation, and thus it is easy and quick to install, it can maintain the structural integrity of the cover 1 and is helpful to improve the water-retaining effect, and the overall appearance is beautiful. Additionally, the base 22 is deformed to be tilted to abut the board 114 so as to stably support the main body 11. In the exemplary embodiment, relative to the axial direction of the through hole 113, a distance of the projection 23 projecting from the through hole 113 is defined as a first length 41, in the axial direction of the through hole 113, a maximum distance between the base 22 and the main body 11 is defined as a second length 42, and the first length 41 is equal to the second length 42.

Preferably, in the axial direction of the through hole 113, a ratio of a maximum length L3 of the base 22 and a maximum length L4 of the projection 23 ranges from 0.9 to 1.1, so that the base 22 and the projection 23 are evenly arranged relative to the receiving space 13, and it ensures the good combination of the base 22 and the projection 23.

Preferably, relative to the axial direction of the through hole 113, a ratio of a maximum length L5 of the base 22 and a maximum length L6 of the projection 23 ranges from 0.6 to 0.85, which ensures that the projection 23 can extend radially to be within the through hole 113.

In the exemplary embodiment, the flange 12 includes a first support surface 121, a second support surface 122 and a third support surface 123, the second support surface 122 is transversely connected to and between the first support surface 121 and the third support surface 123, and the groove 24 is defined by a first surface 25, a second surface 26 and a third surface 27 of the seal 2. The second surface 26 is transversely connected to and between the first surface 25 and the third surface 27, for example, the first surface 25 is perpendicular to the second surface 26. The first surface 25 contacts the first support surface 121, the second surface 26 contacts the second support surface 122, so that the flange 12 can contact and support the seal 2 in multi-points. The third surface 27 and the third support surface 123 are arranged in interval, which is easy to detach the seal 2.

There is a first included angle 31 between the first support surface 121 and the main body 11, and the first included angle 31 ranges from 30 degrees to 60 degrees. The first support surface 121 can prop the base 22 so that the base 22 is stably received in the receiving space 13. There is a second included angle 32 between the first surface 25 and the third surface 27, and the second included angle 32 ranges from 30 degrees to 60 degrees so that the flange 12 is effectively held. The second included angle 32 may be equal to the first included angle 31 so that the third surface 27 and the board 114 are parallel to each other. A free end of the projection 23 includes a first arced surface 231, a second arced surface 124 is connected and between the flange 12 and the board 114, and the second arced surface 124 has a radius larger than a radius of the first arced surface 231. The first arced surface 231 and the second arced surface 124 can effectively reduce the frictional resistance of the faucet during the faucet passes through the faucet trim, and can maintain a relatively rounded surface structure to avoid stress concentration.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A faucet trim including:
   a cover including a main body and a flange, the main body including a first side and a second side opposite to the first side, the main body further including a through hole disposed through the main body from the first side to the second side, the flange projecting obliquely from a periphery of the through hole and being protrusive from the second side, the flange and the main body defining a receiving space therebetween; and
   a seal including a base and a projection divided by an imaginary straight line, the projection projecting from the base, the projection and the base defining a groove in which the flange is engaged;
   wherein the imaginary straight line is perpendicular to an axial direction of the through hole, in the axial direction of the through hole the base is not protrusive beyond the receiving space, in the axial direction of the through hole the projection is located outside the receiving space, and the projection projects radially inward;
   wherein the flange includes a first support surface, a second support surface and a third support surface, the second support surface is transversely connected to and between the first support surface and the third support surface, the groove is defined by a first surface, a second surface and a third surface of the seal, the second surface is transversely connected to and between the first surface and the third surface, and the first surface contacts the first support surface, the second surface contacts the second support surface, and the third surface and third support surface are spaced apart from each other.

2. The faucet trim of claim 1, wherein the main body further includes a board and a lip, the lip extends transversely from the board, the board includes the through hole, the flange projects from the board; in the axial direction of the through hole, a ratio of a vertical distance from an end of the lip to the board and a vertical distance from an end of the flange to the board ranges from 1.8 to 2.3.

3. The faucet trim of claim 1, wherein the seal is disposed around the flange, and in the axial direction of the through hole, a ratio of a maximum length of the base and a maximum length of the projection ranges from 0.9 to 1.1.

4. The faucet trim of claim 1, wherein the first surface is perpendicular to the second surface.

5. The faucet trim of claim 1, wherein there is a first included angle between the first support surface and the main body, and the first included angle ranges from 30 degrees to 60 degrees.

6. The faucet trim of claim 5, wherein the main body further includes a board and a lip, the lip extends transversely from the board, the board includes the through hole, the flange projects from the board; in the axial direction of the through hole, a ratio of a vertical distance from an end of the lip to the board and a vertical distance from an end of the flange to the board ranges from 1.8 to 2.3; the seal is disposed around the flange, the imaginary straight line and the board are parallel to each other, and in the axial direction of the through hole, a ratio of a maximum length of the base and a maximum length of the projection ranges from 0.9 to 1.1; the first surface is perpendicular to the second surface; there is a second included angle between the first surface and the third surface, and the second included angle ranges from 30 degrees to 60 degrees; relative to the axial direction of the through hole, a ratio of a maximum radial length of the base and a maximum radial length of the projection ranges from 0.6 to 0.85; relative to the axial direction of the through hole, a distance of the projection projecting from the through hole is defined as a first length, in the axial direction of the through hole a maximum distance between the base and the main body is defined as a second length, and the first length is equal to the second length; the second included angle is equal to the first included angle; an free end of the projection includes a first arced surface, a second arced surface is connected and between the flange and the board, and the second arced surface has a radius larger than a radius of the first arced surface; the cover is integrally formed of one piece, the seal is integrally formed of one piece, the cover is made of metal, and the seal is made of rubber.

7. The faucet trim of claim 1, wherein there is a second included angle between the first surface and the third surface, and the second included angle ranges from 30 degrees to 60 degrees.

8. The faucet trim of claim 1, wherein relative to the axial direction of the through hole, a ratio of a maximum radial length of the base and a maximum radial length of the projection ranges from 0.6 to 0.85.

9. A faucet trim including:
- a cover including a main body and a flange, the main body including a first side and a second side opposite to the first side, the main body further including a through hole disposed through the main body from the first side to the second side, the flange projecting obliquely from a periphery of the through hole and being protrusive from the second side, the flange and the main body defining a receiving space therebetween; and
- a seal including a base and a projection divided by an imaginary straight line, the projection projecting from the base, the projection and the base defining a groove in which the flange is engaged;
- wherein the imaginary straight line is perpendicular to an axial direction of the through hole, in the axial direction of the through hole the base is not protrusive beyond the receiving space, in the axial direction of the through hole the projection is located outside the receiving space, and the projection projects radially inward;
- wherein relative to the axial direction of the through hole, a distance of the projection projecting from the through hole is defined as a first length, in the axial direction of the through hole a maximum distance between the base and the main body is defined as a second length, and the first length is equal to the second length.

* * * * *